US 6,742,106 B2

(12) United States Patent
Ansari

(10) Patent No.: US 6,742,106 B2
(45) Date of Patent: *May 25, 2004

(54) VECTOR TRANSFER SYSTEM GENERATING ADDRESS ERROR EXCEPTION WHEN VECTOR TO BE TRANSFERRED DOES NOT START AND END ON SAME MEMORY PAGE

(75) Inventor: Ahmad R. Ansari, San Jose, CA (US)

(73) Assignee: NEC Electronics, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/352,511

(22) Filed: Jan. 28, 2003

(65) Prior Publication Data

US 2003/0167387 A1 Sep. 4, 2003

Related U.S. Application Data

(63) Continuation of application No. 09/375,873, filed on Aug. 17, 1999, now Pat. No. 6,513,107.

(51) Int. Cl.$^7$ .............................................. G06F 9/312
(52) U.S. Cl. ................................................ 712/4; 712/6
(58) Field of Search .............................. 712/2, 3, 4, 5, 712/6, 7, 8, 9, 222

(56) References Cited

U.S. PATENT DOCUMENTS 4,128,880 A * 12/1978 Cray, Jr. ...................... 712/4
4,740,893 A    4/1988 Buchholz et al. ........... 712/222
5,179,674 A    1/1993 Williams et al. ............ 711/204
5,247,691 A    9/1993 Sakai ............................ 712/7
5,895,501 A    4/1999 Smith ......................... 711/128
6,065,114 A    5/2000 Zahir et al. .................... 712/4

* cited by examiner

Primary Examiner—Richard L. Ellis
(74) Attorney, Agent, or Firm—Campbell Stephenson Ascolese LLP

(57) ABSTRACT

A vector transfer unit for handling transfers of vector data between a memory and a data processor in a computer system. Vector data transfer instructions are posted to an instruction queue in the vector transfer unit. Program instructions for performing a burst transfer include determining the starting address of the vector data to be transferred, the ending address of the vector data to be transferred, and whether the ending address of the vector data to be transferred is within the same virtual memory page as the starting address. The ending address of the vector data to be transferred is determined based on the number of data elements to be transferred, the stride of the vector data to be transferred, and the width of the vector data elements to be transferred. When the amount of data to be transferred is divisible by a factor of two, the multiplication of the stride and width of the data elements is carried out by shifting. An address error exception occurs when the ending address of the vector data to be transferred is not within the same virtual memory page as the starting address. The ending address of the vector data to be transferred is determined in parallel with determining the starting address of the vector data to be transferred.

15 Claims, 8 Drawing Sheets

| 31 | 30 29 | | 16 15 13 | 11 | 10 7 | 6 3 | 2 0 |
|---|---|---|---|---|---|---|---|
| VBL | VBI | 0000....0000 | EXC. CODE | 00 | VB_ID | VBP_S | BS |

FIG. 4

VECTOR TRANSFER SYSTEM GENERATING ADDRESS ERROR EXCEPTION WHEN VECTOR TO BE TRANSFERRED DOES NOT START AND END ON SAME MEMORY PAGE

This application is a continuation of, and claims the benefit of priority based on, U.S. patent application Ser. No. 09/375,873, entitled "Vector Transfer System Generating Address Error Exception When Vector To Be Transferred Does Not Start And End On Same Memory Page" filed Aug. 17, 1999, now U.S. Pat. No. 6,513,107 and naming Ahmad R. Ansari as the inventor. The above-referenced application is hereby incorporated by reference herein in its entirety.

BACKGROUND OF THE INVENTION

1. Field of the Invention

This invention relates generally to special purpose memory integrated in general purpose computer systems, and specifically to a memory system for efficient handling of vector data.

2. Description of the Related Art

In the last few years, media processing has had a profound effect on microprocessor architecture design. It is expected that general-purpose processors will be able to process real-time, vectored media data as efficiently as they process scalar data. The recent advancements in hardware and software technologies have allowed designers to introduce fast parallel computational schemes to satisfy the high computational demands of these applications.

Dynamic random access memory (DRAM) provides cost efficient main memory storage for data and program instructions in computer systems. Static random access memory (SRAM) is faster (and more expensive) than DRAM and is typically used for special purposes such as for cache memory and data buffers coupled closely with the processor. In general a limited amount of cache memory is available compared to the amount of DRAM available.

Cache memory attempts to combine the advantages of quick SRAM with the cost efficiency of DRAM to achieve the most effective memory system. Most successive memory accesses affect only a small address area, therefore the most frequently addressed data is held in SRAM cache to provide increased speed over many closely packed memory accesses. Data and code that is not accessed as frequently is stored in slower DRAM. Typically, a memory location is accessed using a row and column within a memory block. A technique known as bursting allows faster memory access when data requested is stored in a contiguous sequence of addresses. During a typical burst, memory is accessed using the starting address, the width of each data element, and the number of data words to access, also referred to as "the stream length". Memory access speed is improved due to the fact there is no need to supply an address for each memory location individually to fetch or store data words from the proper address. One shortfall of this technique arises when data is not stored contiguously in memory, such as when reading or writing an entire row in a matrix since the data is stored by column and then by row. It is therefore desirable to provide a bursting technique that can accommodate data elements that are not contiguous in memory.

Synchronous burst RAM cache uses an internal clock to count up to each new address after each memory operation. The internal clock must stay synchronized with the clock for the rest of the memory system for fast, error-free operation. The tight timing required by synchronous cache memory increases manufacturing difficulty and expense.

Pipelined burst cache alleviates the need for a synchronous internal clock by including an extra register that holds the next piece of information in the access sequence. While the register holds the information ready, the system accesses the next address to load into the pipeline. Since the pipeline keeps a supply of data always ready, this form of memory can run as fast as the host system requests data. The speed of the system is limited only by the access time of the pipeline, register.

Multimedia applications typically present a very high level of parallelism by performing vector-like operations on large data sets. Although recent architectural extensions have addressed the computational demands of multimedia programs, the memory bandwidth requirements of these applications have generally been ignored. To accommodate the large data sets of these applications, the processors must present high memory bandwidths and must provide a means to tolerate long memory latencies. Data caches in current general-purpose processors are not large enough to hold these vector data sets which tend to pollute the caches very quickly with unnecessary data and consequently degrade the performance of other applications running on the processor.

In addition, multimedia processing often employs program loops which access long arrays without any data-dependent addressing. These programs exhibit high spatial locality and regularity, but low temporal locality. The high spatial locality and regularity arises because, if an array item n is used, then it is highly likely that array item n+s will be used, where "s" is a constant stride between data elements in the array. The term "stride" refers to the distance between two items in data in memory. The low temporal locality is due to the fact that an array item n is typically accessed only once, which diminishes the performance benefits of the caches. Further, the small line sizes of typical data caches force the cache line transfers to be carried out through short bursts, thereby causing sub-optimal usage of the memory bandwidth. Still further, large vector sizes cause thrashing in the data cache. Thrashing is detrimental to the performance of the system since the vector data spans over a space that is beyond the index space of a cache. Additionally, there is no way to guarantee when specific data will be placed in cache, which does not meet the predictability requirements of real-time applications. Therefore, there is a need for a memory system that handles multi-media vector data efficiently in modem computer systems.

SUMMARY OF THE INVENTION

The present invention provides memory management for an extension to a computer system architecture that improves handling of vector data. The extension, known also as a vector transfer unit (VTU), includes a compiler-directed memory interface mechanism by which vector data sets can be transferred efficiently into and out of the processor under the control of the compiler. Furthermore, the hardware architectural extension of the present invention provides a mechanism by which a compiler can pipeline and overlap the movement of vector data sets with their computation.

Accordingly, the VTU provides a vector transfer pipelining mechanism which is controlled by a compiler. The compiled program partitions its data set into streams, also referred to as portions of the vector data, and schedules the transfer of these streams into and out of the processor in a fashion which allows maximal overlap between the data transfers and the required computation. To perform an operation such as y=f(a,b) in which a, b, and y are all large vectors, the compiler partitions vectors a, b, and y into segments. These vector segments can be transferred between the processor and the memory as separate streams using a burst transfer technique. The compiler schedules these data transfers in such a way that previous computation results are stored in memory, and future input streams are loaded in the processor, while the current computation is being performed.

The compiler detects the loops within an algorithm, schedules read and write streams to memory, and maintains synchronization with the computation. An important aspect of the VTU is that the vector streams bypass the data cache when they are transferred into and out of the processor. The compiler partitions vectors into variable-sized streams and schedules the transfer of these streams into and out of the processor as burst transactions.

A vector buffer is a fixed-sized partition in the vector buffer pool (VBP) which is normally allocated to a single application program and is partitioned by the compiler among variable-sized streams each holding a vector segment.

Data is transferred into and out of the VBP using special vector data instructions. One set of instructions perform the transfer of data between the memory and the vector buffers. Another pair of instructions move the data between the vector buffers and the general-purpose registers (both integer and floating-point registers).

In the present invention, one or more application programs are consecutively processed in the computer system. Each application program issues vector data transfer instructions for transferring vector data between the memory and a vector transfer unit. The vector data transfer instructions are posted to an instruction queue in the VTU. In order to perform a burst transfer, the present invention includes program instructions for determining the starting address of the vector data to be transferred, the ending address of the vector data to be transferred, and whether the ending address of the vector data to be transferred is within one memory page of the starting address. The ending address of the vector data to be transferred is determined based on the number of data elements to be transferred, the stride of the vector data to be transferred, and the width of the vector data elements to be transferred.

In one embodiment of the present invention, the ending address of the vector data to be transferred is determined based on shifting the width of the data elements to be transferred by the stride of the vector data to be transferred. In this embodiment, the amount of data to be transferred is divisible by a factor of two, which allows the multiplication of the stride and width of the data elements to be carried out by shifting.

In another embodiment of the present invention, the ending address of the vector data to be transferred is determined in parallel with determining the starting address of the vector data to be transferred.

One feature of the present invention is that an address error exception occurs when the ending address of the vector data to be transferred is not within one memory page of the starting address. When the data processing system is equipped with virtual memory, the memory page is a virtual memory page.

The foregoing has outlined rather broadly the objects, features, and technical advantages of the present invention so that the detailed description of the invention that follows may be better understood.

BRIEF DESCRIPTION OF THE DRAWINGS

FIG. 4 is a diagram of an embodiment of a configuration register in accordance with the present invention.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
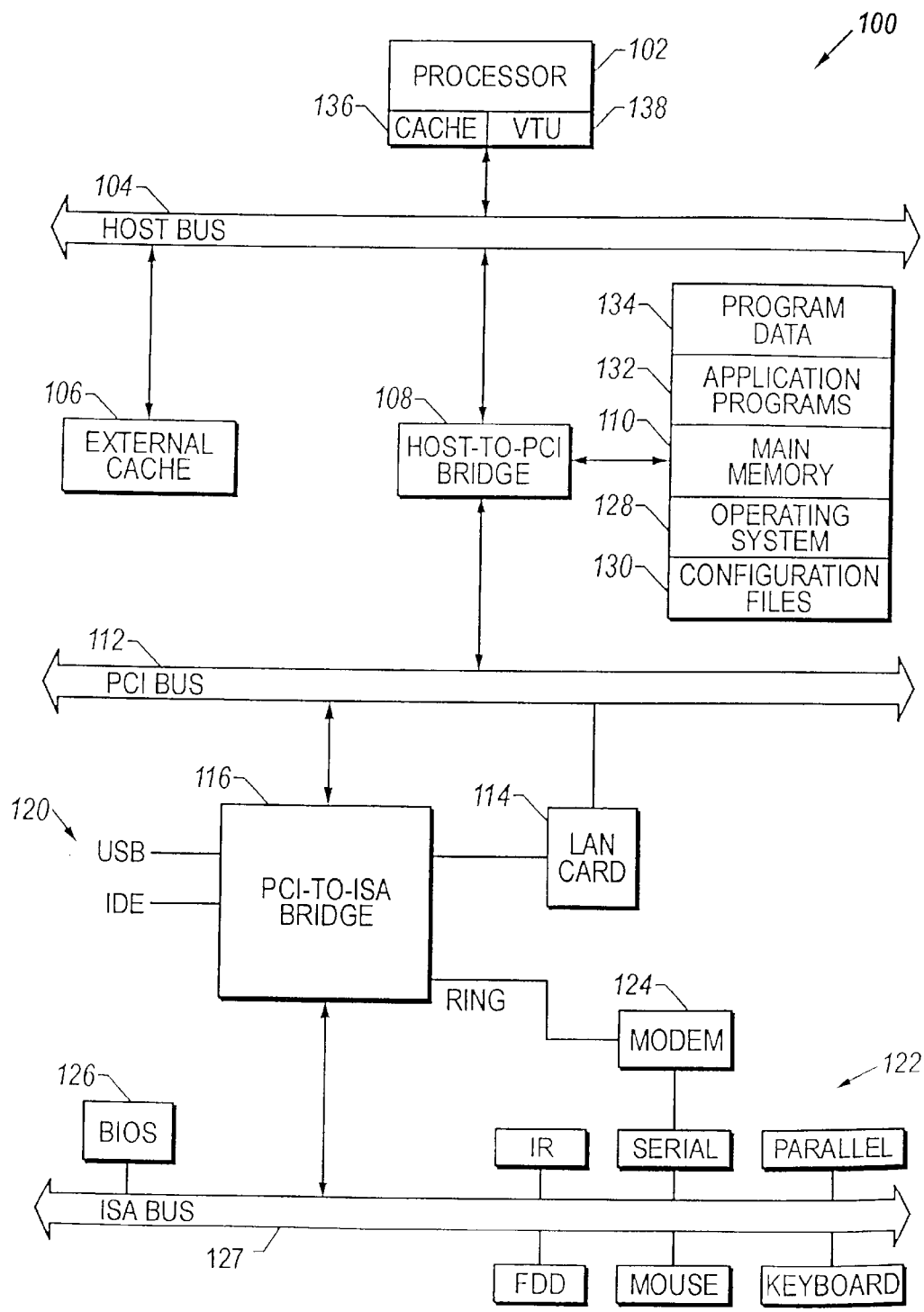
FIG. 1 is a block diagram of a computer system.

FIG. 1 illustrates a computer system 100 which is a simplified example of a computer system with which the present invention may be utilized. It should be noted, however, that the present invention may be utilized in other computer systems having an architecture that is different from computer system 100. Additionally, the present invention may be implemented in processing systems that do not necessarily include all the features represented in FIG. 1.

Computer system 100 includes processor 102 coupled to host bus 104. External cache memory 106 is also coupled to the host bus 104. Host-to-PCI bridge 108 is coupled to main memory 110, includes cache memory 106 and main memory 110 control functions, and provides bus control to handle transfers among PCI bus 1 12, processor 102, cache memory 106, main memory 110, and host bus 104. PCI bus 112 provides an interface for a variety of devices including, for example, LAN card 114. PCI-to-ISA bridge 116 provides bus control to handle transfers between PCI bus 112 and ISA bus 114, IDE and universal serial bus (USB) functionality 120, and can include other functional elements not shown, such as a real-time clock (RTC), DMA control, interrupt support, and system management bus support. Peripheral devices and input/output (I/O) devices can be attached to various I/O interfaces 122 coupled to ISA bus 127. Alternatively, many I/O devices can be accommodated by a super I/O controller (not shown) attached to ISA bus 127. I/O devices such as modem 124 are coupled to the appropriate I/O interface, for example a serial interface as shown in FIG. 1.

BIOS 126 is coupled to ISA bus 127, and incorporates the necessary processor executable code for a variety of low-level system functions and system boot functions. BIOS 126 can be stored in any computer readable medium, including magnetic storage media, optical storage media, flash memory, random access memory, read only memory, and communications media conveying signals encoding the instructions (e.g. signals from a network). When BIOS 126 boots up (starts up) computer system 100, it first determines whether certain specified hardware in computer system 100 is in place and operating properly. BIOS 126 then loads some or all of operating system 128 from a storage device such as a disk drive into main memory 110. Operating system 128 is a program that manages the resources of computer system 100, such as processor 102, main memory 110, storage device controllers, network interfaces including LAN card 114, various I/O interfaces 122, and data busses 104, 112, 127. Operating system 128 reads one or more configuration files 130 to determine the type and other characteristics of hardware and software resources connected to computer system 100.

During operation, main memory 110 includes operating system 128, configuration files 130, and one or more application programs 132 with related program data 134. To increase throughput in computer system 100, program data 134 and instructions from application programs 132 may be placed in cache memory 106, and 136 determined by the pattern of accesses to both data and instructions by the application. Cache memory is typically comprised of SRAM which has relatively fast access time compared to other types of random access memory.

Figure 2:
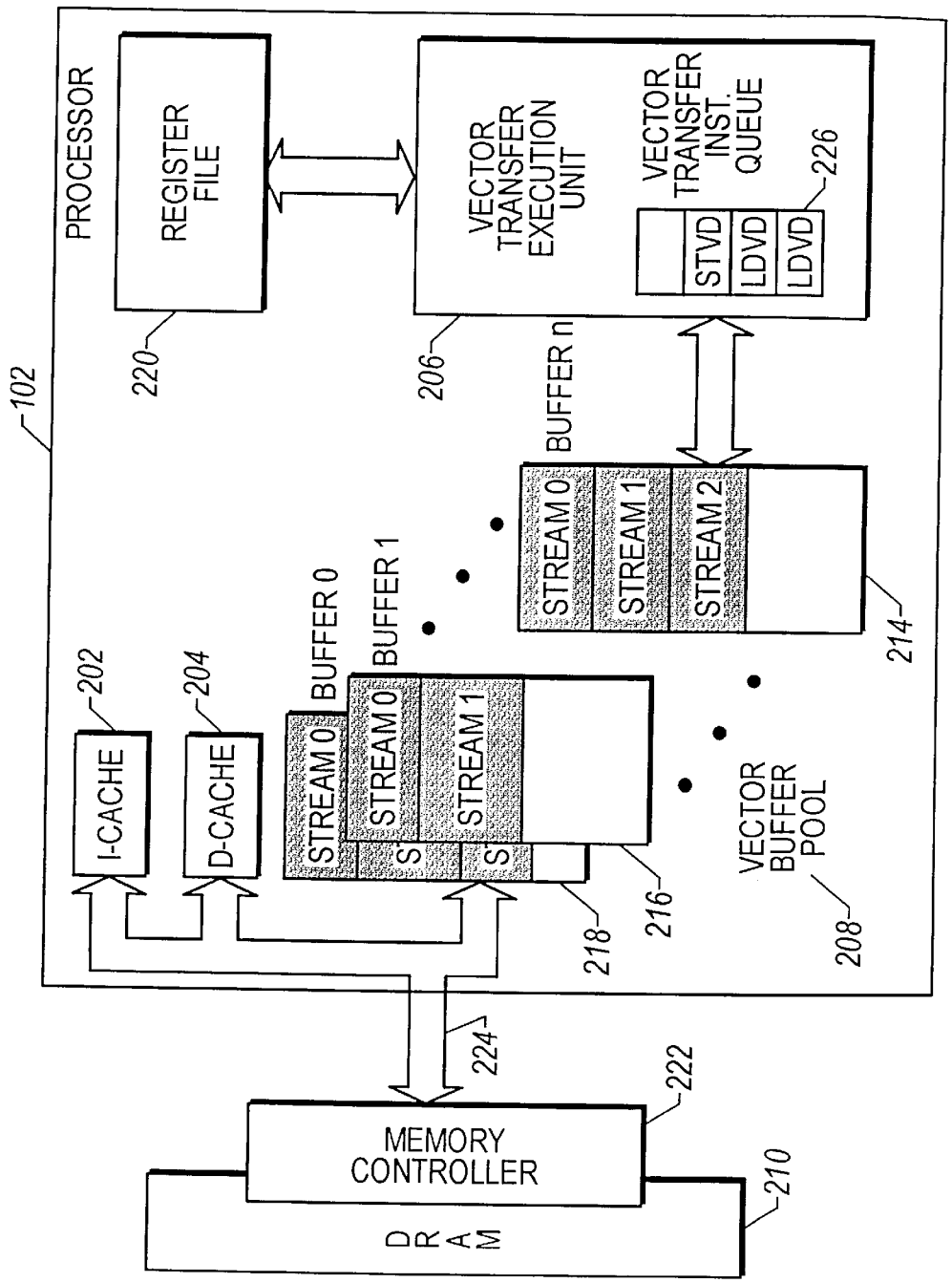
FIG. 2 is a diagram of a vector transfer unit in accordance with the present invention.

As shown in FIGS. 1 and 2, processor 102 includes internal cache memory 136 and Vector Transfer Unit (VTU) 138. Internal cache memory 136 is built into processor 102's circuitry and may be divided functionally into separate instruction caches (I-caches) 202 and data caches (D-caches) 204 where I-cache 202 stores only instructions, and D-cache 204 stores only data. VTU 138 is integrated in processor 102 and includes vector transfer execution unit 206, vector buffer pool (VBP) 208, and an efficient bus protocol which supports burst transfers.

While main memory 110 and data storage devices (not shown) such as disk drives and diskettes are typically separate storage devices, computer system 100 may use known virtual addressing mechanisms that allow programs executing on computer system 100 to behave as if they only have access to a large, single storage entity, instead of access to multiple, smaller storage entities (e.g., main memory 110 and mass storage devices (not shown)). Therefore, while certain program instructions reside in main memory 110, those skilled in the art will recognize that these are not necessarily all completely contained in main memory 110 at the same time. It should be noted that the term "memory" is used herein to generically refer to the entire virtual memory of computer system 100.

Processor 102 operates in both 32-bit and 64-bit addressing modes in which a virtual memory address can be either 32 or 64 bits, respectively. Memory may be accessed in kernel, supervisor, and user memory address access modes. Depending on the addressing mode, the 32-bit or 64-bit virtual address is extended with an 8-bit address space identifier (ASID). By assigning each process a unique ASID, computer system 100 is able to maintain valid translation look-aside buffer (TLB) state across context switches (i.e., switching execution of one program to another in memory). The TLB provides a map that is used to translate a virtual address to a physical address.

Privilege Levels

Memory may be placed in protected virtual address mode with one or more different levels of privileged access. An active program can access data segments in memory that have a privilege level the same as or lower than the current privilege level. In one type of computer system with which the present invention may be utilized, there are three levels of privilege, denoted as kernel, supervisor, and user addressing modes. The kernel of an operating system typically includes at least programs for managing memory, executing task context switches, and handling critical errors. The kernel has the highest privilege level to help prevent application programs 132 from destroying operating system 128 due to programming bugs, or a hacker from obtaining unauthorized access to data. Certain other operating system functions such as servicing interrupts, data management, and character output usually run at a lower privilege level, often referred to as supervisor level. An even lower privilege level is assigned to application programs 132, thereby protecting operating system 128 and other programs from program errors. One embodiment of the present invention supports VTU 138 memory access in kernel, user, and supervisor addressing modes. This allows application programs to bypass operating system 128 to access VBP 208, thereby reducing use of processing resources and overhead associated with accessing memory. Other embodiments of the present invention may be used in computer systems that support additional, or fewer, privilege levels.

Figure 3:
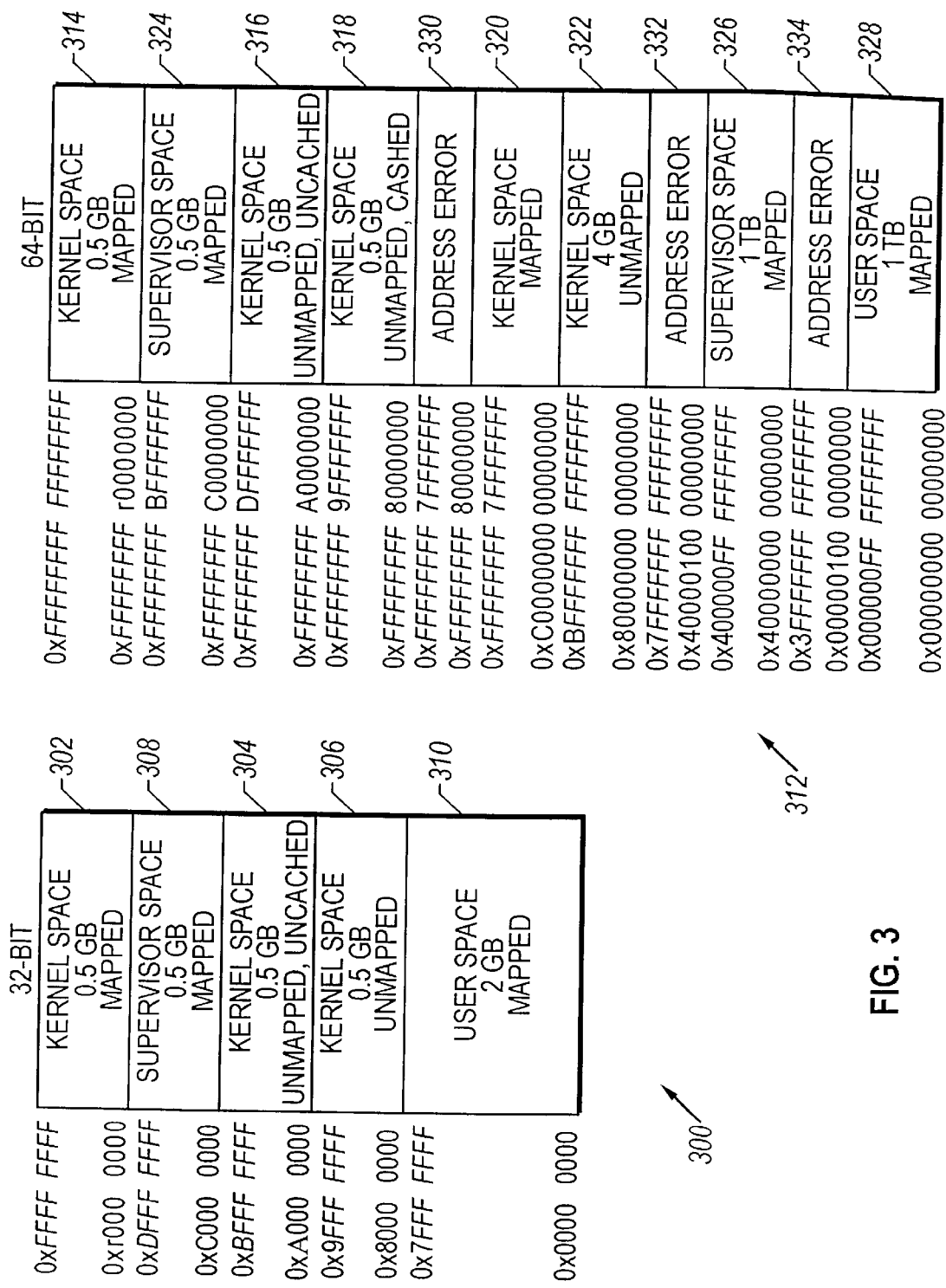
FIG. 3 is a diagram showing memory partitioned into various segments having different privilege access levels, cache characteristics, and mapping characteristics.

FIG. 3 shows memory address space for one embodiment of processor 102. For 32-bit addressing mode, memory address space 300 includes kernel memory segments 302, 304, and 306, supervisor memory segment 308, and user memory segment 310. In 64-bit addressing mode, memory address space 312 includes kernel memory segments 314, 316, 318, 320, and 322, supervisor memory segments 324 and 326, user memory segment 328, and address error segments 330, 332, and 334. In virtual mode, preselected bits in a status register determine whether processor 102 is operating in a privileged mode such as user, supervisor, or kernel. Additionally, memory addressing mode is determined by decoding preselected bits of the virtual address. In one embodiment of the present invention, for example, bits 29, 30, and 31 in 32-bit addressing mode, and bits 62 and 63 in 64-bit addressing mode, are used to select user, supervisor, or kernel address spaces. In this embodiment, all accesses to the supervisor and kernel address spaces generate an address error exception when processor 102 is operating in user mode. Similarly, when processor 102 is operating in the supervisor mode, all accesses to the kernel address space generate an address error exception. It is important to note that the foregoing description is one type of processing system with which the present invention may be utilized, and that the present invention may also be utilized in a variety of other processing systems having different memory modes, privilege levels, and logic for controlling access to memory.

In computer systems known in the prior art, specific bits in the TLB determine whether virtual memory accesses will be cached when the processor is fetching code or data from mapped memory space. For unmapped accesses, the cacheability is determined by the address itself. In the memory segments shown in FIG. 3, for example, accesses to kernel segment 304 (or 316 in 64-bit mode) space are always uncached. Bits 59–61 of the virtual address determine the cacheability and coherency for memory segment 322. Cache memory 136 can be disabled for accesses to memory segment 306 (or 318 in 64-bit mode) space by using bits in a configuration register.

In the present invention, all accesses generated by VTU 138 bypass cache memory 136. Thus, VTU 138 regards the entire memory space as being uncached and the TLB bits, or the bits in the configuration register which control access to cache memory 136, are ignored.

To preserve binary compatibility among different models and generations of processors 102, configuration information such as the size of vector buffer pool 208 in VTU 138, the number of buffers, and the maximum stream size, is stored in a location in processor 102. Application programs 132 read the configuration information and configure themselves for data transfers based on the configuration information. This semi-dynamic allocation mechanism provides a flexible implementation of the present invention that is usable in various processors. Alternatively, a more complex, fully dynamic mechanism may be utilized in which the allocation is completely carried out by the processor, and application program 132 has no control on which buffer is allocated to a vector stream. Processor 102 returns a buffer identification number with a vector load instruction and the program uses the identification number to point to the stream. Note that in either embodiment, each vector buffer is used by one program and each program uses only one buffer.

In one embodiment of the present invention as shown in FIG. 4, configuration register 400 contains configuration information and status bits for VTU 138. It is important to note that configuration register 400 may contain as many bits as required to represent the configuration information, and different fields in addition to or instead of those shown in FIG. 4 may be used. Configuration register 400 may reside in VTU 138 or in another location in computer system 100.

In the example shown in FIG. 4, Buffer Size (BS) in bits 0 through 2 represents the length of vector buffers 214, 216, 218. In one embodiment, the bits are set in various combinations to represent different buffer lengths, for example, bit 0 set to zero, bit 1 set to zero, and bit 2 set to zero represents buffer length(s) of two kilobytes, whereas bit 0 set to 1, bit 1 set to one, and bit 2 set to zerio represents buffer length(s) of 16 kilobytes.

Vector buffer pool size (VBP_S) in bits 3 through 6 represents the number of buffers in vector buffer pool 208.

Vector buffer identification (VB_ID) in bits 7 through 10 represents the identification of the active buffer. It defaults to zero and can only be modified by a program having the appropriate level of privilege to change the parameter, such as the kernel of operating system 128.

In this embodiment, bit 11, bit 12, and bits 16 through 29 are currently not utilized. These bits could be used by other embodiments, or to expand capabilities for the present embodiment.

Bits 13 through 15 represent the code for the exception caused by VTU. If an exception is generated by VTU, the exception processing routine can decode these bits to determine the cause of the exception. For example, a value zero on these bits represents the VTU Inaccessible exception and a value of one signifies an Invalid Buffer Address Exception. Both will be explained later in the discussion regarding VTU instructions hereinbelow.

Vector buffer pool in-use (VBI) in bit 30 indicates whether vector buffer pool 208 is free or in-use.

Vector Buffer Pool Lock (VBL) in bit 31 indicates whether vector buffer pool 208 is allocated to a program or available for use by a program.

Address Space Protection

A technique known in the art as "paging" is used in computer system 100 where physical memory is divided in blocks (pages) of a fixed size. Physical address space is directly addressable while logical address space is the set of abstract locations addressed by a program. A memory map translates logical address space to physical address space. The logical address space may be discontiguous and larger than the physical address space. Only a portion of the logical address space is brought into the physical address space at a time.

When processor 102 is accessing memory in a mapped space, the vector stream which is being transferred must be contained entirely within a single virtual page. If a stream is allowed to cross a virtual page boundary, the memory locations accessed by the stream may not be contiguous in the physical memory, as each virtual page could be mapped to any physical page.

In one embodiment of the present invention, memory 210 is DRAM. To address a location in DRAM memory 210, the physical address is partitioned into a row and a column address, which are sequentially presented to the DRAM memory controller 222. The row address determines the DRAM page and the column address points to a specific location in the DRAM page (the page mode access). The performance of memory 210 depends mainly on the latency in the row access and the data rate in the column access. In recent DRAM architectures, if consequent accesses fall in the same DRAM page of memory 210, the row address is provided only for the first access and it is latched for the succeeding accesses. Since the latency of a row access is longer than a page mode access, this mechanism greatly improves the performance for burst accesses to sequential vector-like data sets by amortizing the row access latency over the page mode accesses.

To ensure that a vector stream does not cross a virtual page boundary, processor 102 determines whether both the beginning and ending addresses fall within the same virtual page of memory 210. Since VTU 138 is provided only with the starting address, the stream length, and the stride, processor 102 calculates the ending address by multiplying the vector length by the stride and adding the result to the starting address (taking into account the appropriate data width) according to the following equation:

Address of last entry=((Stream length−1)*Stride*Data width)+ Address of first entry In another embodiment of the present invention, the size of the streams are restricted to powers of two, which allows the multiplication to be carried out by shifting the stride. The amount of shift is determined by the stream length. When data width is a power of two, the second multiplication inside the parentheses will be a shift operation. The above equation may thus be restated as:

Address of last entry=(Stream Length*Stride*Data Width)+(Address of first entry-[Stride*Data Width])

All multiplications in the above equation can be performed by using shift operations. The first and second parentheses can be evaluated in parallel and their results added to calculate the address of the last entry of the stream.

Compiler

In order to take advantage of the capabilities for handling transfers of vector data using VTU 138, the present invention utilizes a compiler that identifies statements within a program which would benefit from block data transfers to and from processor 102. As each program is compiled, the compiler looks for loops which contain operations using arrays. Candidate loops include, but are not limited to, those where the indices to the array have a constant stride and offset, (e.g., for(i=x; i<y; i+=step)), there are no conditional statements in the loop which alter the pattern of vector data flow, and, where the loop trip count can be determined during compilation, a loop trip count that is large enough to result in a performance gain after accounting for the overhead, if any, associated with setting up the array in VTU 138. Relevant loops can also be identified by the user before compilation, such as by using a special instruction recognized by the compiler.

Once the code is identified, the loop needs to be divided in a series of blocks to be processed through vector buffers 214, 216, 218. The vector data used by each iteration of the loop is allocated to different streams in the buffer. The compiler uses instructions that allow the data to be handled by VTU 138 in a series of stream loads and stores.

Compiler Instructions

The compiler utilized with the present invention includes several compiler instructions that apply to handling vector buffer pool 208 in VTU 138 including load vector, store vector, move vector from buffer, move vector to buffer, synchronize vector transfer, and free vector buffer.

The load vector instruction, denoted by LDVw in one embodiment, loads a vector from memory 210 to a vector buffer, such as one of buffers 214, 216, or 218. The LDVw instruction contains the 32-bit or 64-bit (depending on the addressing mode) virtual memory address for the first vector element, the starting vector buffer address, the length of the vector stream (restricted to a power of two such as 2, 4, 8, 16, or 32), and the stride of the vector stream (i.e, the distance between each entry in memory 210). To use this embodiment of the LDVw instruction, the following syntax is used:

LDVw $R_S$, $R_T$ where:
$R_S$ is the virtual memory address for the first vector element; and
$R_T$ is a set of fields including the starting vector buffer address, the length of the vector stream, and the stride of the vector stream.

The format of one embodiment of the LDVw instruction is:

| Bits 31–26 | Bits 25–21 | Bits 20–16 | Bits 15–13 | Bits 12–11 | Bits 10–6 | Bits 5–0 |
|---|---|---|---|---|---|---|
| COP2 010010 | $R_S$ | $R_T$ | 000 | $W_1 W_0$ | 00000 | LDV 101000 | where:
COP2 is a label for a major opcode (010010) relating to vector and multimedia data;
LDV is a label for a minor opcode (101000) for the load vector instruction; and
$W_1$ and $W_0$ bits in the instruction determine the width of the data being transferred, as follows:

| Instruction | $W_1 W_0$ | Data Width |
|---|---|---|
| LDVB | 00 | Byte |
| LDVH | 01 | Half Word (2 bytes) |
| LDVW | 10 | Word (4 bytes) |
| LDVD | 11 | Double word (8 bytes) |

The format of one embodiment of $R_T$ is:

| Bits 63–48 | Bits 47–35 | Bits 34–32 | Bits 31–0 |
|---|---|---|---|
| Stride | xxx xxxx xxxx | Length | Buffer Starting Address |

There are several exceptions that may be raised with this instruction when an invalid or erroneous operation is attempted. In one embodiment, a first exception that may be raised is the TLB refill exception which indicates that a virtual address referenced by the LDV instruction does not match any of the TLB entries. Another exception is the TLB invalid exception that indicates when the referenced virtual address matches an invalid TLB entry. A third exception that may be raised is the Buss Error exception that indicates when a bus error is requested by the external logic, such as included in memory controller 222, to indicate events such as bus time out, invalid memory address, or invalid memory access type. A fourth exception is the Address Error exception which indicates that the referenced virtual address is not aligned to a proper boundary.

The exceptions listed in the preceding paragraph are typical of standard exceptions that are implemented in many different computer processor architectures. In one embodiment of VTU 138, additional types of exceptions relating to one or more of the vector transfer instructions are also implemented. For example, the Invalid Buffer Address exception may be implemented to indicate that the buffer address referenced by the LDV instruction is beyond the actual size of the buffer. Another exception that is specifically implemented in VTU 138 is the VTU Inaccessible exception that indicates that the VBL bit in the VTU control register is set and a VTU instruction is being executed.

The next VTU instruction that is implemented is the store vector instruction, denoted in one embodiment by STVw, which stores a vector from a vector buffer, such as one of buffers 214, 216, or 218, to memory 210. The STVw instruction contains the 32-bit or 64-bit (depending on the addressing mode) virtual memory address for the first vector element, the starting vector buffer address, the length of the vector stream (restricted to a power of two such as 2, 4, 8, 16, or 32), and the stride of the vector stream (i.e, the distance between each entry in memory 210 ). To use this embodiment of the STVw instruction, the following syntax is used:

STVw $R_S$, $R_T$ where:
$R_T$ is a set of fields including the starting vector buffer address, the length of the vector stream, and the stride of the vector stream.

The format of one embodiment of the STVw instruction is:

| Bits 31–26 | Bits 25–21 | Bits 20–16 | Bits 15–13 | Bits 12–11 | Bits 10–6 | Bits 5–0 |
|---|---|---|---|---|---|---|
| COP2 010010 | $R_S$ | $R_T$ | 000 | $W_1 W_0$ | 00000 | STV 101001 | where:
COP2 is a label for a major opcode (010010) relating to vector and multimedia data;
STV is a label for a minor opcode (101001) for the store vector instruction; and
$W_1$ and $W_0$ bits in the instruction determine the width of the data being transferred, as follows:

| Instruction | $W_1 W_0$ | Data Width |
|---|---|---|
| STVB | 00 | Byte |
| STVH | 01 | Half Word (2 bytes) |
| STVW | 10 | Word (4 bytes) |
| STVD | 11 | Double word (8 bytes) |

The format of one embodiment of $R_T$ is:

| Bits 63–48 | Bits 47–35 | Bits 34–32 | Bits 31–0 |
|---|---|---|---|
| Stride | xxx xxxx xxxx | Length | Buffer Starting Address |

As with the LDV instruction, there are several exceptions that may be raised with the STV instruction when an invalid or erroneous operation is attempted including the TLB refill exception, the TLB invalid exception, the Bus Error exception, the Address Error exception, the Invalid Buffer Address exception, and the VTU Inaccessible exception, as described hereinabove for the LDV instruction.

The next VTU instruction, the move vector from buffer instruction, denoted in one embodiment by MVF.type.w, transfers a vector from a vector buffer, such as one of buffers 214, 216, or 218, to register file 220. The entry point in the vector buffer pointed to by the contents of register $R_S$ is loaded into the $R_T$ register. Depending on the type, $R_T$ represents an integer or floating-point register. The data in the vector buffer must be on its natural boundary. To use this embodiment of the MVF.type.w instruction, the following syntax is used:

MVF.type.w $R_S$, $R_T$ where:
  type indicates format such as integer or floating point;
  w determines the width of the data being transferred;
  $R_S$ is the virtual memory address for the starting entry in the vector buffer;
  $R_T$ is an integer or floating point register, depending on type.

The format of one embodiment of the MVF.type.w instruction is:

| Bits 31–26 | Bits 25–21 | Bits 20–16 | Bits 15–14 | Bit 13 | Bits 12–11 | Bits 10–6 | Bits 5–0 |
|---|---|---|---|---|---|---|---|
| COP2 010010 | $R_S$ | $R_T$ | 000 | Integer/ Floating-point | $W_1 W_0$ | 00000 | MVF 101010 | where:

COP2 is a label for a major opcode (010010) relating to vector and multimedia data;

MVF is a label for a minor opcode (101010) for the move vector from buffer instruction; and $W_1$ and $W_0$ bits in the instruction determine the width of the data being transferred, as follows:

| Instruction | $W_1 W_0$ | Data Width |
|---|---|---|
| MVF.type.B | 00 | Byte |
| MVF.type.H | 01 | Half Word (2 bytes) |
| MVF.type.W | 10 | Word (4 bytes) |
| MVF.type.D | 11 | Double word (8 bytes) |

The Invalid Buffer Address exception, and the VTU Inaccessible exception, as described hereinabove for the LDV instruction, are implemented in VTU 138 for use with the MVF instruction.

The move vector to buffer instruction, denoted in one embodiment by MVT.type.w, transfers a data element to a vector buffer, such as one of buffers 214, 216, or 218, from register file 220. The least significant portion of register $R_T$ is transferred into the vector buffer entry pointed to by the contents of register $R_S$. Depending on the type, $R_T$ represents an integer or floating-point register. The data in the vector buffer must be on its natural boundary. To use this embodiment of the MVT.type.w instruction, the following syntax is used:

MVT.type.w $R_S$, $R_T$ where:
  type indicates format such as integer or floating point;
  w determines the width of the data being transferred;
  $R_S$ is the address for the entry in the vector buffer;
  $R_T$ is an integer or floating point register, depending on type.

The format of one embodiment of the MVT.type.w instruction is:

| Bits 31–26 | Bits 25–21 | Bits 20–16 | Bits 15–14 | Bit 13 | Bits 12–11 | Bits 10–6 | Bits 5–0 |
|---|---|---|---|---|---|---|---|
| COP2 010010 | $R_S$ | $R_T$ | 000 | Integer/ Floating-point | $W_1 W_0$ | 00000 | MVT 101011 | where:

COP2 is a label for a major opcode (010010) relating to vector and multimedia data;

MVT is a label for a minor opcode (101011) for the move vector from buffer instruction; and $W_1$ and $W_0$ bits in the instruction determine the width of the data being transferred, as follows:

| Instruction | $W_1 W_0$ | Data Width |
|---|---|---|
| MVT.type.B | 00 | Byte |
| MVT.type.H | 01 | Half Word (2 bytes) |

-continued

| Instruction | $W_1 W_0$ | Data Width |
|---|---|---|
| MVT.type.W | 10 | Word (4 bytes) |
| MVT.type.D | 11 | Double word (8 bytes) |

The Invalid Buffer Address exception, and the VTU Inaccessible exception, as described hereinabove for the LDV instruction, are also used with the MVT instruction.

Another instruction unique to VTU 138 is the synchronize vector transfer instruction, denoted in one embodiment by SyncVT, ensures that any VTU 138 instructions fetched prior to the present instruction are completed before any VTU 138 instructions after this instruction are allowed to start. SyncVT blocks the issue of vector transfer instructions until all previous vector transfer instructions (STVw, LDVw) are completed. This instruction is used to synchronize the VTU 138 accesses with computation. To use this embodiment of the SyncVT instruction, the following syntax is used:

SyncVT

The format of one embodiment of the SyncVT instruction is:

| Bits 31–26 | Bits 25–6 | Bits 5–0 |
|---|---|---|
| COP2 010010 | 0000 0000 0000 0000 0000 | SyncVT |

The free vector buffer instruction, denoted in one embodiment by FVB, is used to make the active vector buffer in vector buffer pool 208 accessible to other programs. The instruction clears the vector buffer in-use (VBI) bit in configuration register 400.

| Bits 31–26 | Bits 25–6 | Bits 5–0 |
|---|---|---|
| COP2 010010 | 0000 0000 0000 0000 0000 | FVB 101100 |

The VTU Inaccessible exception, as described hereinabove for the LDV instruction, can also be generated by the FVB instruction.

Vector Buffer Pool (VBP)

In one embodiment, VBP 208 is SRAM which is partitioned into fixed-sized vector buffers. The SRAM may be dual port RAM where data can be read and written simultaneously in the memory cells. In another embodiment, VBP 208 includes parity bits for error detection in buffers 214, 216, and 218. The compiler allocates one or more buffers 214, 216, 218 to each program, and partitions each buffer 214, 216, 218 into variable-sized vector streams. Another embodiment of VBP 208 includes only one dual-ported SRAM vector buffer that is allocated to one program at a time. The dual-ported SRAM allows one stream to be transferred between VBP 208 and memory 210 while elements from another stream are moved to register file 220 for computation or the result of a specific computation updates another stream. The present invention may also utilize multiple buffers in VBP 208, thereby enabling a wider variety of implementations.

In another embodiment, two single-port SRAM banks may be substituted for dual-port SRAM in one or more of buffers 214, 216, 218. Only certain types of programs can be accelerated using single-port SRAM, however, such as programs requiring a contiguous vector buffer for doing multilevel loop nests (e.g. matrix multiply), data re-use (e.g. infinite impulse response (IIR) filters), and data manipulation (e.g. rotation). Two single-port vector buffers may also be used advantageously with other sets of program instructions, such as a fast, local SRAM for look-up tables.

Vector Transfer Execution Unit

VTU 138 is implemented to execute in parallel with cache memory 136. On to one side, VTU 138 interfaces to memory controller 222, and on the other side it is connected the processor core that includes register file 220 and vector transfer execution unit 206. This configuration achieves high throughput on memory bus 224 by performing vector transfers and executing program instructions using vector data without blocking the pipeline.

The compiler transfers vector streams between VBP 208 and memory 210 by using load vector (LDVw) and store vector (STVw) instructions. The variable w indicates the width of the data to be transferred, such as b for bytes, h for half-words, w for words, and d for double-words. Each instruction uses four operands specified in two registers. The starting virtual address of the stream is provided in one register, and the vector buffer address, stream length, and stride are all stored in a second register.

When the data is loaded into one of buffers 214, 216, and 218, it can be transferred to register file 220 in processor 102 through MVF.type and MVT.type instructions, where the "type" bit in these instructions determines whether the target register for the instruction is an integer or a floating-point register. These instructions are similar to regular load and store, however they operate on buffers 214, 216, and 218 rather than memory 210.

A synchronization instruction, SyncVT, is used to ensure that any VTU instructions fetched prior to the present instruction are completed before any VTU instructions after this instruction are allowed to start, and to synchronize accesses to memory 210 by VTU 138 with computation. A typical portion of pipelined code sequence may appear as:

LDV <stream1>
LDV <stream2>
SyncVT
LDV <stream3>
LDV <stream4>
<streamA>=f(<stream1>, <stream2>)
SyncVT
STV <streamA>
LDV <stream5>
LDV <stream6>
<streamB>=f(<stream3>, <stream4>)

If the program instructions including VTU instructions are issued sequentially in order, when a SyncVT instruction is used, it could block the issue of all instructions and not just the vector transfer instructions. By judicious code relocation, the compiler can alter the placement of the SyncVT instructions so as not to block the processor unnecessarily. Thus, in the present invention, when burst instructions (i.e., instructions that transfer streams of data between memory 210 and a vector buffer) are issued, their execution does not block the execution of other instructions.

When a vector transfer stream instruction (LDVw or STVw) is issued, VTU 138 performs a TLB access on the starting address of the stream which is provided by the instruction. While the virtual-to-physical address translation is being performed, VTU 138 verifies that the ending address of the stream does not fall in another virtual page. If the stream crosses a page boundary, an address error exception is generated. After the address translation, the instruction is posted to vector transfer instruction queue (VTIQ) 226. The vector instructions posted in VTIQ 226 are executed in order independent of the instructions in the processor pipeline. When a SyncVT instruction reaches the issue stage, it stops the issue of all vector transfer unit instructions until all VTU instrucions have been executed.

Vector Buffer Ownership

VBP 208 is partitioned into one or more vector buffers 214, 216, 218 which can be allocated to different programs. Processor 102 only allows one vector buffer to be active at a time, and allocation of the vector buffers 214, 216, and 218 is carried out by operating system 128 using each program's ASID.

Figure 5:
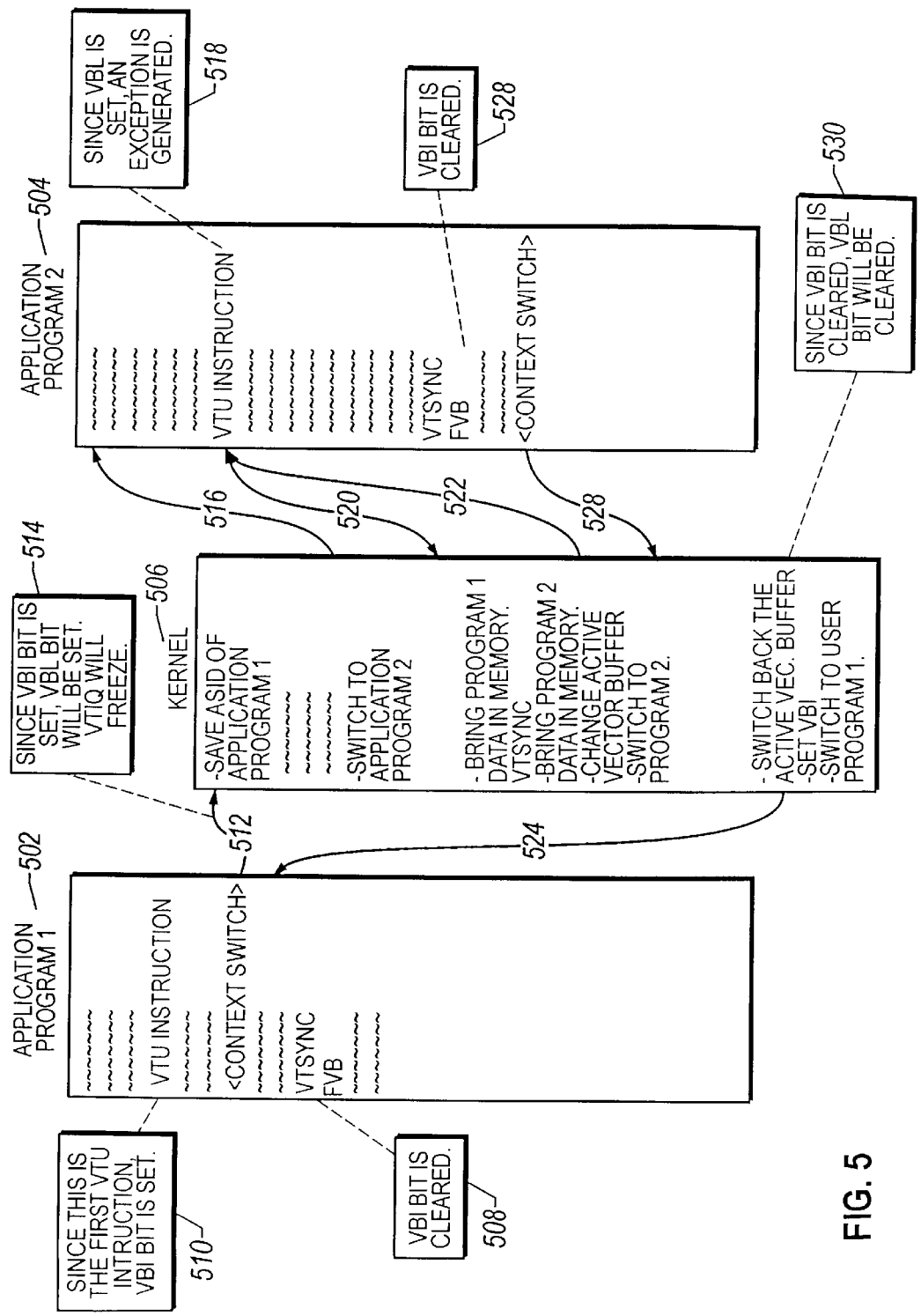
FIG. 5 shows a state diagram for managing a vector buffer pool during a context switch in accordance with the present invention.

In the present invention, operating system 128 allocates VBP 208 among multiple programs. FIG. 5 illustrates how ownership of VBP 208 is managed during a context switch (i.e., when switching execution from one application program 502 to another application program 504 ). VBP 208 is accessed only by one program at a time, however, kernel 506 or operating system 128 can always access VBP 208 and overwrite the access-right of another program to VBP 208. The vector buffer lock (VBL) and vector buffer in-use (VBI) bits in configuration register 400 control access rights to the active buffer in VBP 208. Note that VTIQ 226 is used only by one program at a time and kernel 506 must empty this queue (execute all VTU instructions in the queue) before another program is allowed to use VTU 138.

When bit VBL is zero, the current program can access the active vector buffer in VBP 208 through VTU instructions. If the VBL bit is set, execution of any VTU instruction will cause a VTU inaccessible exception. In that case, kernel 506 can decide whether and how bit VBL will be cleared and execution is switched back to the VTU instruction which caused the exception. If the active vector buffer is in use by a program, bit VBL is set when an interrupt (including context switching) takes place. This bit can also be modified by kernel 506 using an appropriate instruction. When a program accesses VBP 208 successfully, bit VBI is set. Bit VBI will be set until cleared by the application program using it. As shown in block 508, bit VBI can be cleared by using another VTU instruction, known in one embodiment as free vector buffer (FVB). Similar to all the other VTU instructions, the FVB instruction can be executed only if bit VBL is cleared, or by kernel 506. Otherwise, a VTU inaccessible exception will be generated.

When processor 102 is reset, both VBL and VBI bits are cleared. Kernel 506 can use the active vector buffer at any time and bits VBL and VBI are ignored. Issue of the first vector transfer instruction by a program causes bit VBI to be set as shown in block 510. When context switch 512 takes place, bit VBL is set as shown in block 514, which prevents second application program 504 from accessing VBP 208. When bit VBL is set, no vector transfer instructions are executed out of VTIQ 226 as shown in block 514. Kernel 506 stores the ASID of the previous program (ID of the active vector buffer owner), and performs context switch 516 to second application program 504.

When second application program 504 attempts to access VBP 208 by using a VTU instruction, a VTU inaccessible exception is generated since bit VBL is set as shown in block 518. At this point, control transfers to kernel 506 (context switch 520), and, depending on the availability of buffers 214, 216, 218 in VBP 208, kernel 506 can empty VTIQ 226 either by executing a SyncVT instruction followed by switching the active vector buffer and performing context switch 522 to second application program 504, or by blocking second application program 504 and performing context switch 524 back to first application program 502. Before performing context switch 524 back to first application program 502, kernel 506 checks the ASID of first application program 502 with the stored ASID, and, if they match, kernel 506 sets bit VBI, and switches the execution back to first application program 502. When first application program 502 is finished using VTU 138, SyncVT and FVB instructions are issued, and bit VBI is cleared as shown in block 508.

If kernel 506 alternatively performs context switch 522, second application program 504 resumes execution until finished. Before performing context switch 528, second application program 504 issues SyncVT and FVB instructions, and bit VBI is cleared, as shown in block 528. Since bit VBI is cleared, bit VBL will be cleared during context switch 524 to first application program 502.

Bus Architecture

Memory bus 224 provides burst transfers required by VTU 138. In one embodiment, the protocol for memory bus 224 is a 64-bit, asynchronous protocol that can accommodate burst transfers of variable sizes. In this protocol, the end of the data transfer is signaled by any logic device connected to processor 102 that receives requests from processor 102. Such a logic device is also referred to as an external agent.

If the data associated with a stream is located in contiguous locations in memory 210 or if the width of the data entries is equal to the width of memory bus 224, VTU transfer instructions transfer the data utilizing the entire bandwidth of memory bus 224. However, for streams whose data elements are smaller than the width of memory bus 224, and the stride between their data elements is larger than one, each transfer on memory bus 224 would carry data which is smaller than the width of bus 224, resulting in suboptimal usage of memory bus 224.

Figure 6A:
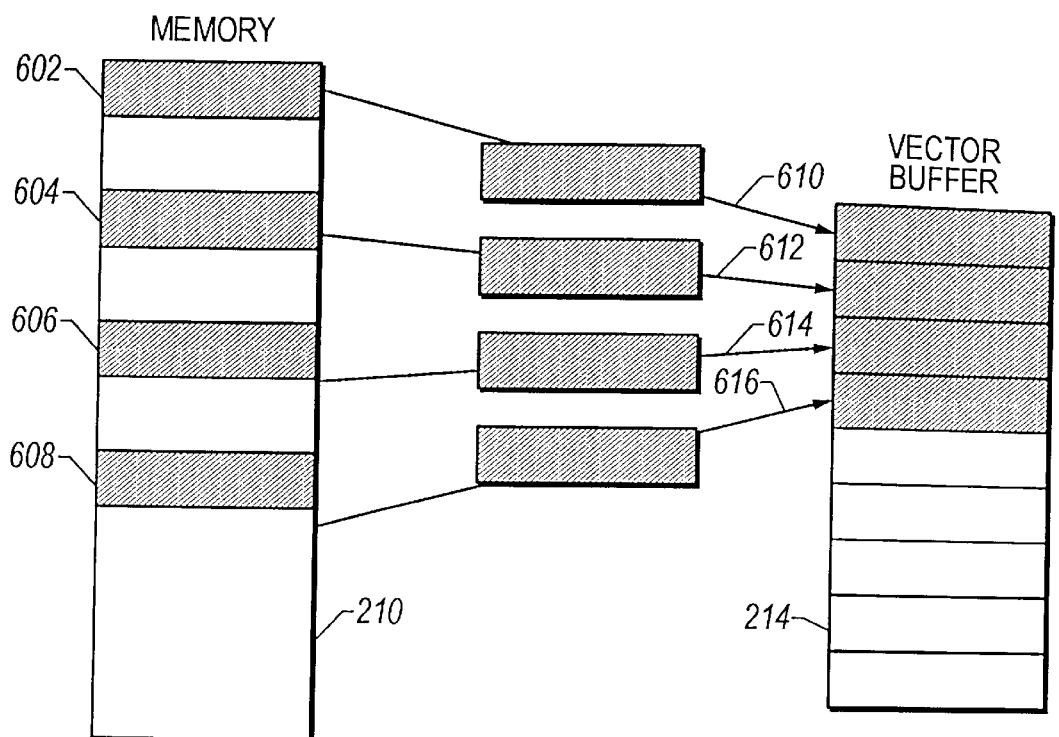
FIG. 6a shows an example of data transfer requirements with unpacked data elements.
Figure 6B:
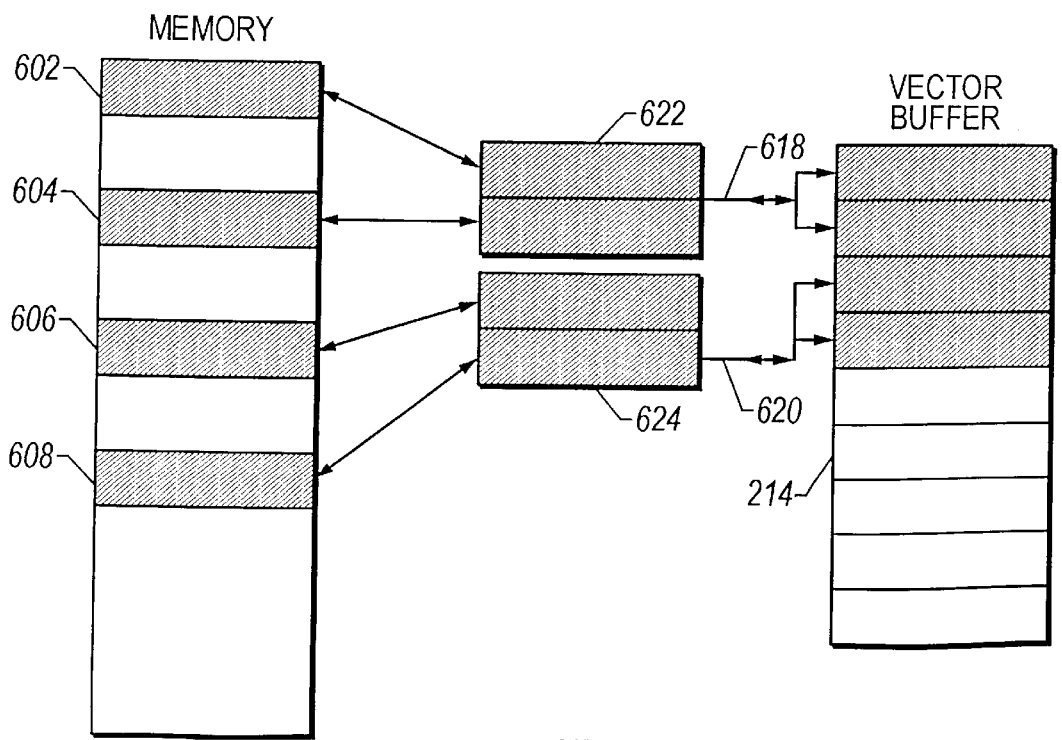
FIG. 6b shows an example of data transfer requirements with packed data elements using a packing ratio of two.

For such cases, it is possible that memory controller 222 can pack two or more data elements into a larger block which would use memory bus 224 more efficiently. As an example, FIG. 6a shows that four word data elements 602, 604, 606, 608 require four separate transfers 610, 612, 614, 616 when data elements 602, 604, 606, 608 are not combined, whereas FIG. 6b shows that only two transfers 618, 620 are required when the elements are packed in doubleword packages 622, 624. The protocol for memory bus 224 implements such a capability by allowing packing ratios of 1, 2, 4, and 8. The maximum block size which is transferred in one instance on memory bus 224 is 8 bytes wide, therefore, not all packing ratios can be used with all data widths. The possible packing ratios for each data width is as follows:

| Data Width | Possible Packing Ratios |
| --- | --- |
| Byte | 1, 2, 4, 8 |
| Halfword | 1, 2, 4 |
| Word | 1, 2 |
| Double Word | 1 |

Thus, for data sizes less than a double word, if the data elements are not laid out contiguously in memory 210 (i.e., stride is greater than one (1)), the possible data packing ratios are 1, 2, 4, and 8. It is important to note that another memory bus 224 may be utilized with the present invention that have a width that is different from 64 bits. The possible data packing ratios would therefore vary accordingly.

Information about the size of the burst, its stride, and the implemented packing ratio is conveyed from processor 102 to the external agent. The capability to read and write bytes (8 bits) in VBP 208 is required regardless of the implemented width vector buffer 214. In one embodiment of the present invention, therefore data in vector buffers 214, 216, 218 are aligned on a natural boundary (e.g. a double-word is aligned on an 8-byte address boundary).

Burst Transactions

Figure 7:
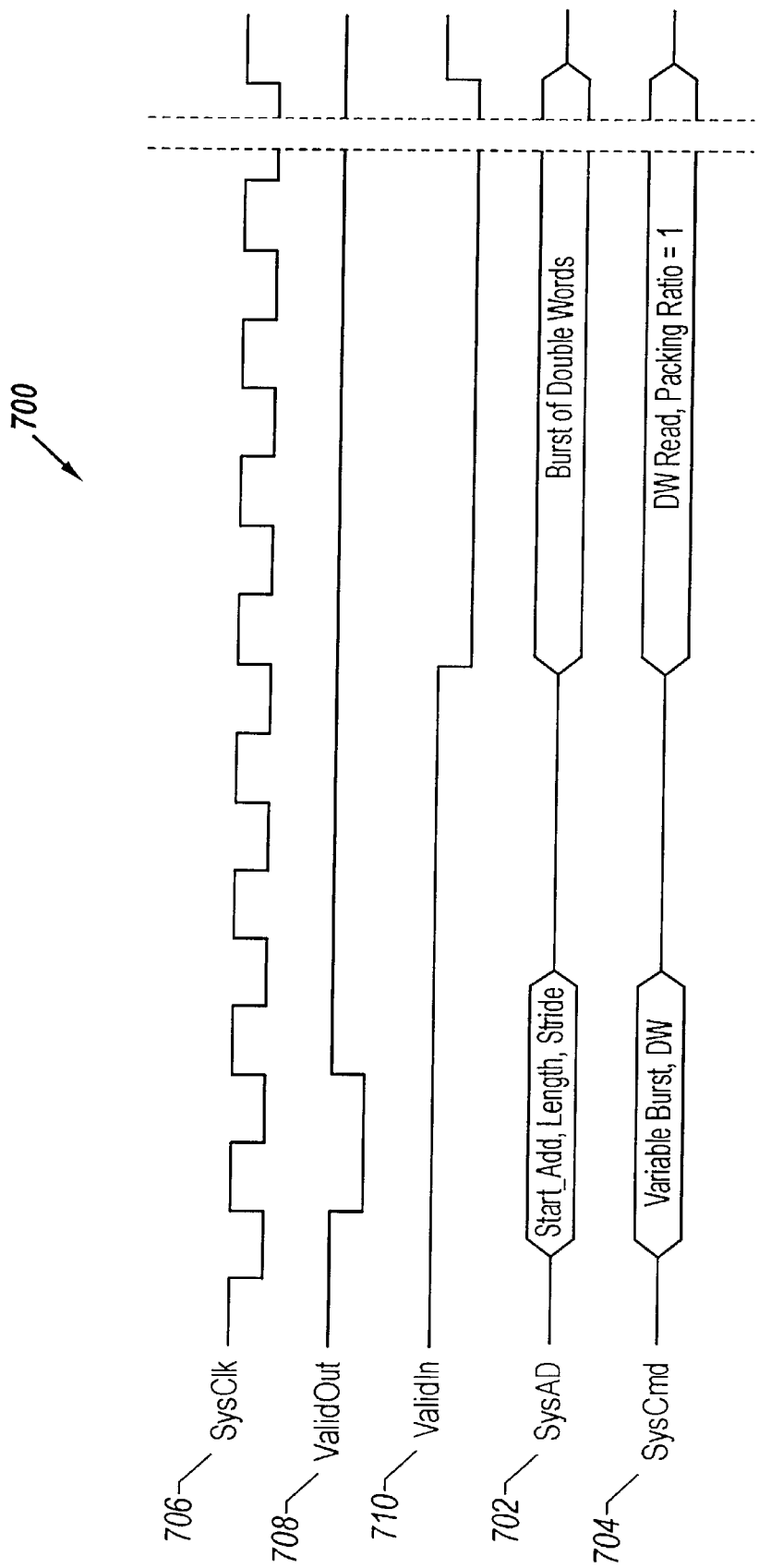
FIG. 7 shows a timing diagram for a variable-length vector burst.
Figure 8:
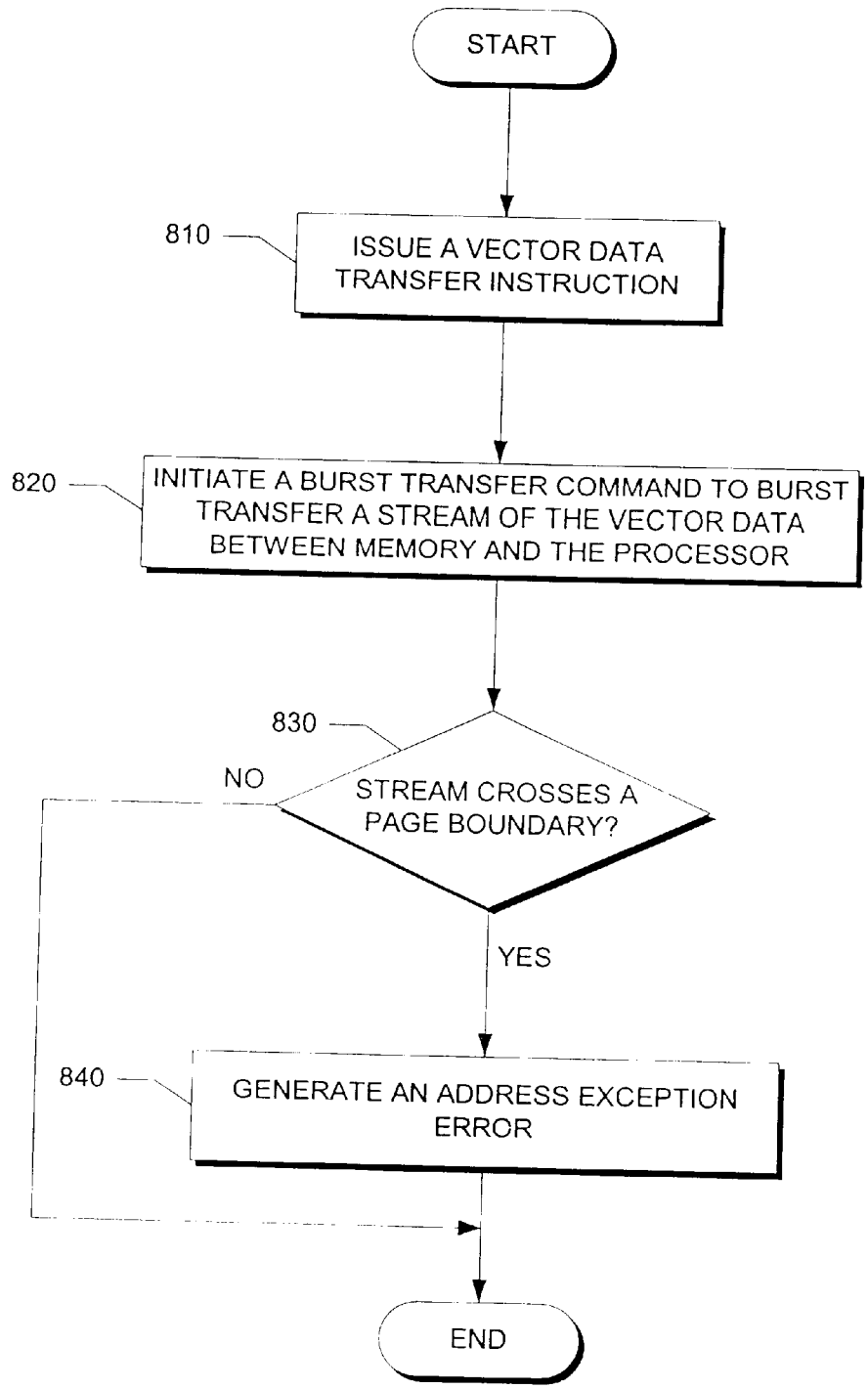
FIG. 8 is a flow chart illustrating steps performed during the process of transferring vector data between a memory and a vector buffer according to an embodiment of the invention.

FIG. 7 shows a timing diagram 700 for a variable-length vector burst. In one embodiment, memory bus 224 includes a 64-bit unified address and data (SysAD) bus 702, a 9-bit command (SysCmd) bus 704, and handshaking signals SysClk 706, ValidOut 708, and ValidIn 710. SysAD bus 702 and SysCmd bus 704 are bi-directional, i.e., they are driven by processor 102 to issue a processor request, and by an external agent to issue an external request. On SysAD bus 702, the validity of the addresses and data from processor 102 is determined by the state of ValidOut signal 708. Similarly, validity of the address and data from the external agent is determined by ValidIn signal 710. SysCmd bus 704 provides the command and data identifier for the transfer.

To provide variable-sized transfers, two new burst read and burst write commands are provided with the list of other known commands on SysCmd bus 704. When a burst read or burst write cycle is initiated during the address cycle, the starting address, burst length, and stride are provided to the external agent on SysAD bus 702. The external agent can latch this information with the address.

A stream is not necessarily required to be contained within a page of DRAM memory 210 for computer system 100 according to the present invention to operate correctly. If a stream crosses a DRAM page boundary in memory 210, there is an interruption in the burst transfer from the external agent to processor 102 and vice versa. The performance of VTU 138 will degrade if the number of streams crossing one or more pages of memory 210 becomes considerable relative to the total number of memory accesses. SysAD bus 702 determines if an interruption in the data transfer has occurred based on the state of the ValidIn signal 710 or ValidOut signal 708.

To gain maximum efficiency in burst accesses, the stream which is transferred should be completely contained in one memory page to eliminate page change latencies. In one embodiment of the present invention, a fixed number of vector buffer bytes, such as 4096 bytes (512 doublewords), are allocated to every application program 132. The present invention may be implemented so that only one application program 132 has access to VBP 208 at a time and therefore VBP 208 contains one vector buffer 214 having a predetermined number of bytes. Different bit combinations in configuration register 400 are used to specify vector buffer size. Additional vector buffers 214, 216, 218 can be provided to allow one or more vector buffers to be allocated among multiple application programs 132.

The present invention advantageously provides concurrent (pipelined) memory transfer bursts and processor computation, and both read and write burst transfers with variable stride through memory. The present invention also allows application programs 132 to hold data in vector buffers 214, 216, 218 to exploit temporal locality of vector data.

Application programs 132 that handle large amounts of vector data, such as multimedia processing, large block of vector data comprise a major portion of the data used by the program. Performance of D-cache 204 is greatly enhanced with the present invention since VTU 138 offloads D-cache 204 from handling large blocks of vector data. Using VTU 138, each vector can reside in any page and the cost of switching page boundaries is amortized over the entire transaction by using long burst transfers. At the application level, the compiler can extract vector streams and exercise an efficient scheduling mechanism to achieve performance improvements. Additionally, scatter/gather operations can be implemented in the present invention by allowing both read and write-back bursts which stride through memory 210. In contrast, D-cache 204 line fill mechanisms can only implement unit stride transfers efficiently.

While the invention has been described with respect to the embodiments and variations set forth above, these embodiments and variations are illustrative and the invention is not to be considered limited in scope to these embodiments and variations. For example, the vector instructions may have different names and different syntax than the vector instructions that were discussed hereinabove. Accordingly, various other embodiments and modifications and improvements not described herein may be within the spirit and scope of the present invention, as defined by the following claims.

What is claimed:

1. A method comprising:

issuing a vector data transfer instruction to transfer a stream of vector data between a memory and a processor, the vector data transfer instruction including a starting address of the stream, a stream length, and a stride of the stream;

determining an ending address of the stream from the starting address, the stream length, the stride, and a memory bus data width;

initiating a burst transfer command to burst transfer the stream of vector data between the memory and the processor, the burst transfer command initiated on a system command bus; and generating an address exception when it is determined that the stream crosses a page boundary of a page in the memory.

2. The method of claim 1 wherein the determining the ending address comprises:

multiplying the stride and the memory bus data width to provide a first result;

subtracting one from the stream length to provide a second result;

multiplying the first result and the second result to provide a third result; and adding the third result to the starting address to provide the ending address.

3. The method of claim 1 further comprising:

transferring the stream of vector data between the memory and a vector buffer of the processor via a burst transfer.

4. The method of claim 3 further comprising:

interrupting the transferring in response to generating the address exception.

5. The method of claim 3 further comprising:

operating on another stream of vector data while the transferring is being performed.

6. The method of claim 1 further comprising:

performing a burst transfer of the stream of vector data from the memory directly to a vector buffer of the processor, the burst transfer bypassing a data cache of the processor.

7. The method of claim 6 wherein the vector buffer is an active vector buffer identified by a configuration register of the processor.

8. The method of claim 1 further comprising:

dividing vector data of a computer program into a plurality of streams.

9. The method of claim 8 further comprising:

generating vector data transfer instructions which when executed configure a logic device to transfer the plurality of streams between the memory and the processor via burst transfers.

10. A computer readable medium comprising instructions executable by a computer, wherein the instructions when executed cause the computer to perform a method comprising:

initiating a burst transfer command to burst transfer a stream of vector data between a memory and a processor, the burst transfer command initiated on a system command bus;

determining an ending address of the stream from a starting address, a stream length, a stride, and a memory bus data width;

determining whether a vector data stream crosses a page boundary of a page in a memory; and generating an address exception when it is determined that the stream crosses the page boundary.

11. The computer readable medium of claim 10 wherein the method further comprises:

transferring the stream of vector data between the memory and a vector buffer of the processor via a burst transfer.

12. The computer readable medium of claim 10 wherein the method further comprises:

operating on another stream of vector data while the transferring is being performed.

13. The computer readable medium of claim 10 wherein the method further comprises:

performing a burst transfer of the stream of vector data from the memory directly to a vector buffer of the processor, the burst transfer bypassing a data cache of the processor.

14. A data processing system comprising:

a memory;

a data cache coupled to the memory;

an instruction cache coupled to the memory;

a vector buffer coupled to the memory, wherein the vector buffer is configured to store a plurality of streams of vector data;

a vector transfer instruction queue configured to store a plurality of vector data transfer instructions, at least one vector data transfer instruction including a stream starting address, a stream length, and a stride of the stream;

a vector transfer execution unit coupled to the vector buffer, wherein the vector transfer execution unit is configured to determine an ending address of the stream from the starting address, the stream length, the stride, and a memory bus data width, and wherein the vector transfer execution unit is configured to determine whether a stream of the plurality of streams crosses a page boundary of the memory.

15. The data processing system of claim 14 wherein the vector transfer execution unit is further configured to:

generate an address exception when it is determined that a stream of the plurality of streams crosses a page boundary of the memory.

* * * * *